Sept. 4, 1951 O. E. DE LANGE ET AL 2,566,405

FREQUENCY MODULATION

Filed June 4, 1948 4 Sheets-Sheet 1

INVENTORS: O. E. DeLANGE
W. M. GOODALL
BY H. A. Burgess
ATTORNEY

Sept. 4, 1951 O. E. DE LANGE ET AL 2,566,405

FREQUENCY MODULATION

Filed June 4, 1948 4 Sheets-Sheet 2

INVENTORS: O. E. DeLANGE
W. M. GOODALL

BY H. A. Burgess

ATTORNEY

INVENTORS: O. E. DeLANGE
W. M. GOODALL
BY H. A. Burgess
ATTORNEY

Sept. 4, 1951 O. E. DE LANGE ET AL 2,566,405

FREQUENCY MODULATION

Filed June 4, 1948 4 Sheets-Sheet 4

INVENTORS: O. E. DeLANGE
W. M. GOODALL
BY H. A. Burgess
ATTORNEY

Patented Sept. 4, 1951

2,566,405

UNITED STATES PATENT OFFICE 2,566,405

FREQUENCY MODULATION

Owen E. De Lange, East Orange, and William M. Goodall, Oakhurst, N. J., assignors to Bell Telephone Laboratories, Incorporated, New York, N. Y., a corporation of New York Application June 4, 1948, Serial No. 31,134

11 Claims. (Cl. 332—23)

This invention relates to frequency modulation of sustained waves by signaling or control variations.

The invention aims to produce effective modulation of the frequency of a carrier wave by a modulating wave of broad frequency range, with large deviations of the carrier frequency, with a good degree of linearity and with low accompanying amplitude modulation. For certain types of signal, such as television, the invention aims to secure satisfactory frequency modulation by signal waves extending in frequency range from some high value down to direct current.

In the illustrative embodiments of the invention to be disclosed herein in detail, there is, or need be, but a single oscillator tube, provided with a feedback path from its output to its input, for producing the oscillations. Modulation is effected by introducing phase changes at a point in this feedback path under control of the modulating signal. These phase changes would disturb the relations necessary to the production of oscillations except that a reactive circuit in the feedback path has a phase shift characteristic so related to frequency as to allow the circuit to maintain the phase relations required for oscillation at a shifted frequency from that corresponding to zero modulating signal. The circuit takes up a new frequency of oscillation for every shift of phase produced by the signal and true frequency modulation is produced.

A feature of the invention comprises the use of a non-linear impedance in the feedback path to counteract tendency toward amplitude modulation due to non-linear phase shift in the signal-controlled phase shifter.

As a further feature of the invention, the non-linear impedance is connected in shunt to the reactive-circuit phase shifter to improve linearity of frequency modulation.

Another feature of the invention lies in a novel way of restoring, at the modulator input, the direct current component in the case of television or other signals having variable direct current bias.

The various objects and features of the invention will appear more fully from the following detailed description of illustrative embodiments of the invention shown in the accompanying drawings in which.

Figure 1:
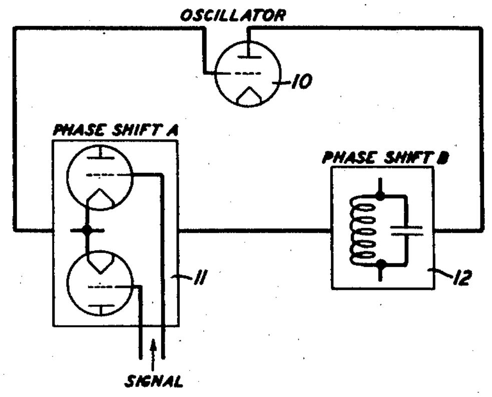
Fig. 1 is a simplified schematic diagram of the basic circuit of the invention to show the principle of operation.

In the diagrammatic Fig. 1 the oscillator tube 10 has a feedback path consisting entirely of a phase shifter 11 and a phase shifter 12 in tandem. As is well known, the conditions for oscillation are that the gain around the loop is unity and the phase shift at the oscillation frequency is 360 degrees. If half of this phase shift takes place in the tube 10 itself, the remaining 180 degrees must be provided by the elements 11 and 12 together.

It is assumed that the phase shift of element 11 is varied (advanced or retarded) in proportion to the instantaneous value of a modulating signal applied thereto and that this phase shift is independent of frequency.

Figure 2:
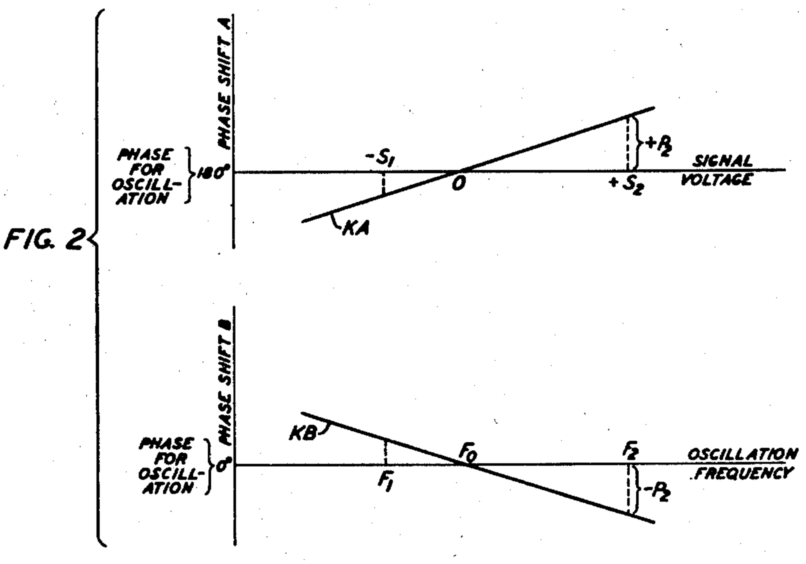
Figs. 2 and 3 are graphs to be referred to in the description of Fig. 1.

Let it be assumed that the relation between signal voltage and phase shift A contributed by element 11 be as represented by graph KA of Fig. 2 and that a signal $+S_2$ be applied, producing in phase shifter 11 a shift from normal amounting to $+P_2$ degrees. This shift will upset the phase relations necessary to oscillation unless compensated somewhere in the feedback loop.

Phase shifter 12 has a zero phase shift at the nominal oscillation frequency (signal=0) and a relation between oscillation frequency and phase shift as given by graph KB of Fig. 2. At a frequency $F_2$, therefore, phase shifter 12 will contribute just enough negative phase shift to compensate the phase shift $+P_2$ from normal assumed to have taken place in element 11 as a result of the signal. The conditions for oscillation are then fulfilled at frequency $F_2$ instead of at the nominal frequency $F_0$. This assumes that the gain is still unity around the loop, an assumption justified by practice within operating limits.

The graphs KA and KB are shown, arbitrarily, as straight lines, and for simplicity, of the same numerical value of slope but opposite in sign. In any case, the abscissa scales in the two diagrams may be adjusted to make this hold. Under these conditions the oscillation frequency will be linearly proportional to the signal amplitude because the A phase shift is always compensated by the B phase shift at a frequency departure from nominal value in direct proportion to the signal. Thus for signal $S_1$ (negative in sign) a corresponding oscillation frequency $F_1$, lower than $F_0$, will be found and so also for any other signal voltage.

Certain relationships are observable. Steeper slope of graph KA corresponds to increased modulation sensitivity, while smaller slope in graph KB corresponds to increased modulation sensitivity. For maximum modulation sensitivity and linearity the transmission frequency band around the entire loop should be made as broad and as flat as possible. Also, while graphs KA and KB have been assumed for simplicity to be straight lines, some curvature can be tolerated and if the curvatures are properly related some compensation may be secured by opposing non-linearities in the two relationships.

In order to make phase shifter 11 substantially independent of frequency, it consists, as will be described, of a pair of grid-controlled tubes whose plate currents are in quadrature and whose impedances are oppositely varied by the signal. The vector relations are given in Fig. 3. Zero signal results in equal plate currents $I_1$ and $I_2$. The quadrature relation is obtained by grid impedances $L_1$, $C_1$, $R_1$ and $R_2$ in known configuration giving an input impedance $R=R_1=R_2=\sqrt{L_1/C_1}$ (constant resistance network). At the nominal frequency $F_0$, $$2\pi F_0=\frac{1}{\sqrt{L_1C_1}}$$

the plate current vectors are added (plates directly connected together), in quadrature, giving resultant vector I for zero signal. A signal of finite magnitude and proper sign shortens vector $I_1$, to a value $I_1'$ and gives a lengthened vector $I_2'$ in place of $I_2$. The resultant $I'$ is shifted in phase by a definite angle A. So long as the phase shift is small, of the order of 30 degrees, it is substantially independent of frequency and the amplitude of the phase shifted current is substantially constant.

Figure 4:
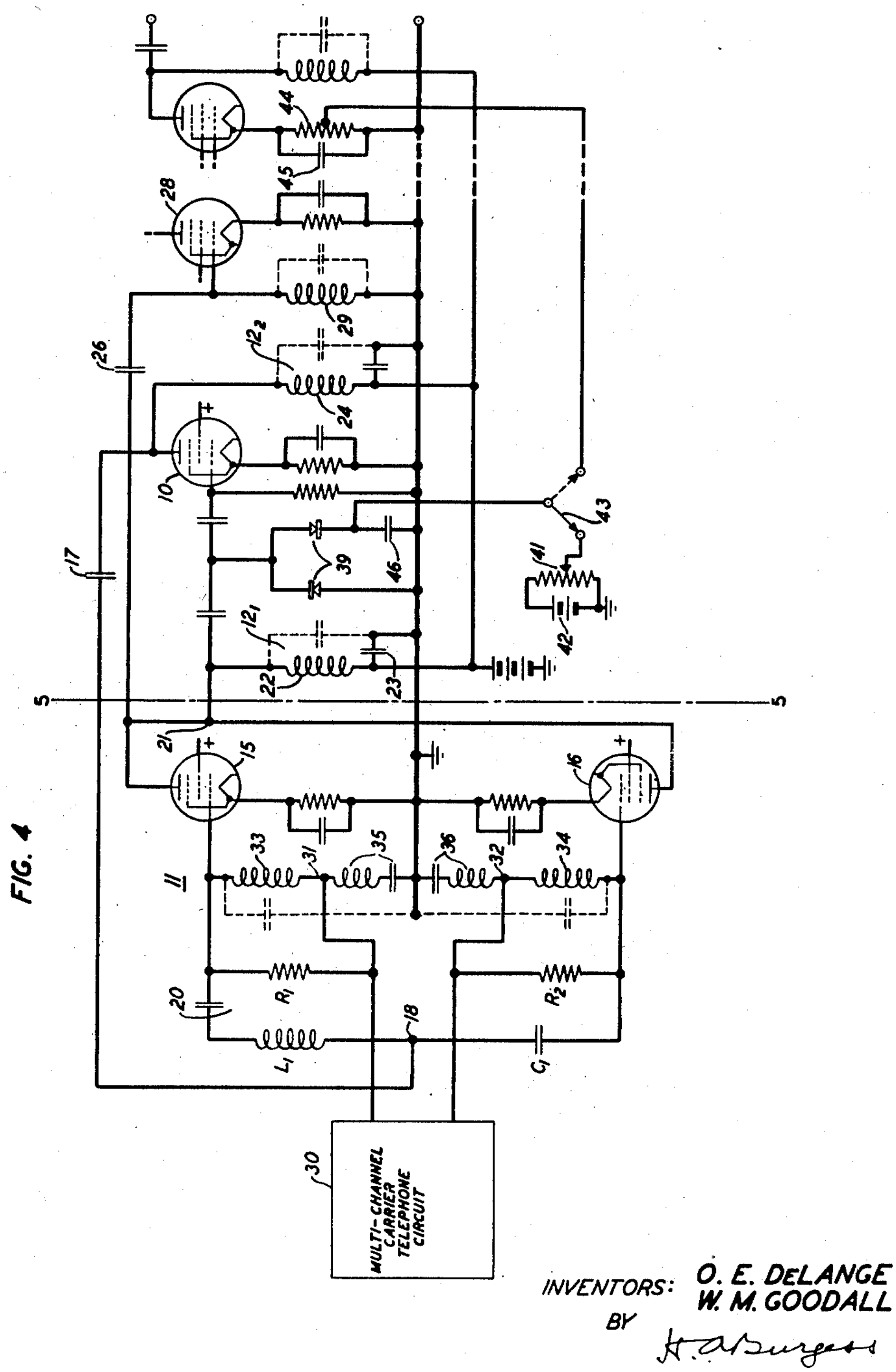
Figs. 4 and 5 are schematic circuit diagrams of typical embodiments of the invention, the circuit of Fig. 5 replacing that part of Fig. 4 to the left of the dividing line 5—5.

Fig. 4 shows how the invention may be embodied in a modulator capable of handling a broad band signal which, for illustration, may be a large group of carrier telephone channels covering the frequency band from 1 megacycle to 2 megacycles. These are to be transmitted by frequency modulation produced in the circuit of Fig. 4, the nominal frequency being for illustration, 65 megacycles.

The Fig. 1 components in this circuit are found in the broad band amplifier tube 10, push-pull phase shifter 11 and other phase shifting elements (12) comprising mainly anti-resonant circuits $12_1$ and $12_2$.

Phase shifter 11 has tubes 15 and 16 with their grids connected push-pull across phase shift network 20 consisting of $L_1$, $C_1$, $R_1$, $R_2$. The feed-back path for tube 10 is from its plate through stopping condenser 17 to junction point 18 in the constant resistance phase shifting network 20, through the transconductances of tubes 15 and 16 to plate junction point 21, and through the coupling circuit between this point and the grid of tube 10. Phase shifter 12 of Fig. 1, is as stated, made up principally of the anti-resonant circuits $12_1$ and $12_2$, each consisting of an inductance in the plate feed circuit tuned at nominal frequency $F_0$ by the parasitic capacities of the tubes and associated circuit elements. Inductance 22 is tuned with a total capacity made up of the output capacities of tubes 15 and 16 and input capacity of tube 10. Inductance 24 is tuned with the output capacity of tube 10, to the nominal frequency. The tuning of this circuit is very broad since it is shunted by the constant resistance network 20 which may have a relatively low resistance, e. g., 220 ohms. The output for the modulated oscillations is taken from junction point 21 through stopping condenser 26 to the grid of the first stage 28 of an output amplifier. Grid coil 29 is tuned by the output capacity of tubes 15 and 16 in parallel with the input capacity of tube 28.

The modulating signal input 30 is connected in push-pull relation to the grids of tubes 15 and 16, at points 31 and 32. The grid-cathode impedances of these tubes appear in shunt to the resistors $R_1$ and $R_2$. In order to prevent these capacities from changing the characteristics of the phase shifting network 20 they are tuned out by the inductances 33 and 34. The series tuned circuits 35 and 36, resonant at $F_0$, tie the points 31 and 32 to ground at the carrier frequency. This has the effect of grounding one end of each resistor $R_1$ and $R_2$ for the high frequencies. Point 18 and ground then become opposite points of a diagonal of a bridge consisting of $L_1$, $C_1$, $R_1$ and $R_2$ so far as high frequencies are concerned.

Figure 3:
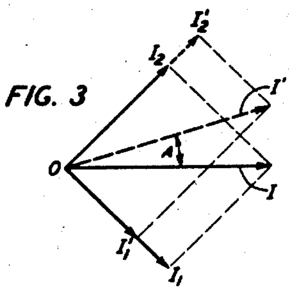

The type of phase shift control by the signal represented in Fig. 3 tends to keep the loop gain constant since the plate current changes in tubes 15 and 16 nearly cancel each other and the resultant vectors are nearly equal in length. There is some inequality, however, resulting in a certain amount of unwanted amplitude modulation. To reduce this to an unobjectionable residue, non-linear resistors 39, oppositely poled, are shown shunting the anti-resonant circuit 12, in the grid circuit of tube 10. Increase of current through these resistors decreases their resistance, so that they tend to hold the voltage at junction point 21 constant.

These same resistors have a beneficial effect upon the action of the frequency-versus-phase characteristic of the anti-resonant circuit 12, by providing variable damping. The phase shift-versus-frequency departure of a damped anti-resonant circuit is linear for small frequency departure but increases less rapidly than the frequency departure (the ends of characteristic KB of Fig. 2 bend inward toward the frequency axis). This means that the phase shift is relatively too small at these large frequency departures. The phase shift can be increased, however, at these frequencies by reducing the damping of the anti-resonant circuit. The loop gain tends to decrease with increasing departure from nominal frequency on account of the reduction in impedance of the anti-resonant circuits and this results in a too low amplitude at large frequency departures. These amplitude variations can be availed of for self-regulation by means of the shunting varistors, for as the amplitude tends to decrease at large frequency departures the resistance increases in the shunting varistors, thus reducing the damping and allowing increase in phase shift.

The damping can be controlled by adjustment of the bias voltage on the varistors. This can be done manually by adjustment of potentiometer 41 on battery 42 when switch 43 is in its left-hand position (full line) or it can be done automatically, when switch 43 is thrown to its right-hand position, by voltage taken from a cathode resistor 44 in one of the output amplifier stages. This voltage corresponds to an average value of output current, the time average being determined by the time constant of the circuit especially resistance 44 and capacity 45, together with capacity 46.

Figure 5:
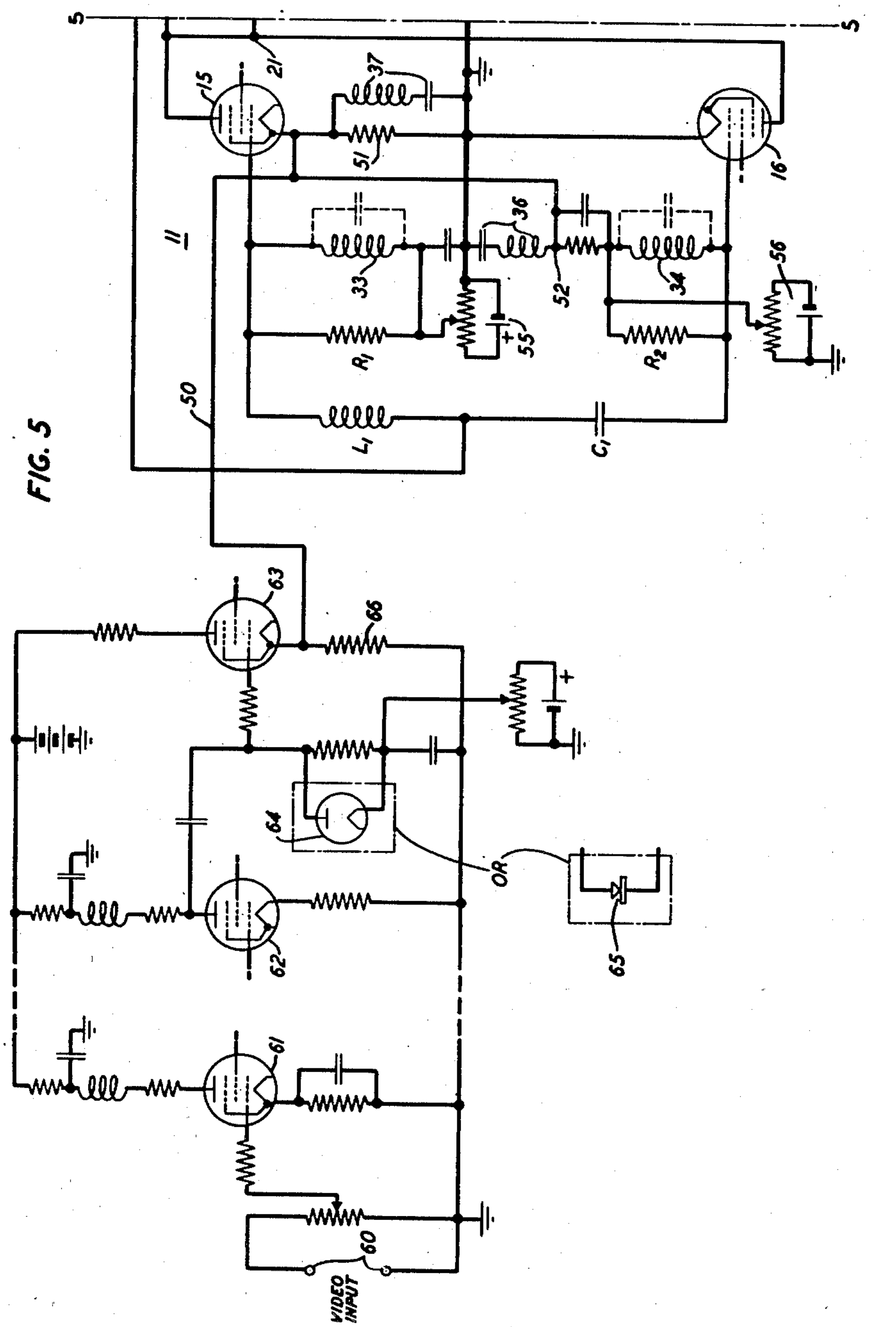

In the circuit of Fig. 5, shown with a video input signal, instead of applying the modulating signal to the grids of the phase shifter tubes 15 and 16 in the normal push-pull manner, the signal is applied to the cathode of tube 15 and the grid of tube 16 by connecting the ungrounded lead 50 of the signal input to the ungrounded end of cathode resistor 51 and to point 52 which has the same low frequency voltage as the grid of tube 16. This type of connection simplifies the application of a direct current bias restorer when this may be necessary in the video input, since it is not necessary to provide a restorer for each side of the circuit as would be necessary for normal push-pull connection. With the Fig. 5 type of input connection frequency deviations take place similar to those in the case of the Fig. 4 connection.

The modulator circuit is otherwise generally similar to that of Fig. 4 as indicated by use of similar reference characters. However, there are detail differences. Series resonant branch 37 tuned to $F_0$ is placed around cathode resistor 51 to keep the cathode of tube 15 at ground potential at the high operating frequencies. Use of resistor 51 tends to produce unequal bias on tubes 15 and 16. Adjustable bias sources are provided at 55 and 56. Since resistor 51 tends to bias the grid of tube 15 too far negative, source 55 provides for a positive bias. Source 56 provides a negative bias for tube 16.

Referring now to the video input to the modulator and the direct current restorer, the video signals, without direct current bias, are applied to terminals 60 of the terminal amplifier consisting of a suitable number of resistance-capacity coupled stages 61, 62 followed by the direct current amplifier stage 63 having diode 64 (or other rectifier 65 such as a germanium crystal) connected in shunt to its grid. Stage 63 is a cathode-follower having its cathode connected to coupling resistor 66 and to output lead 50.

Figure 6:
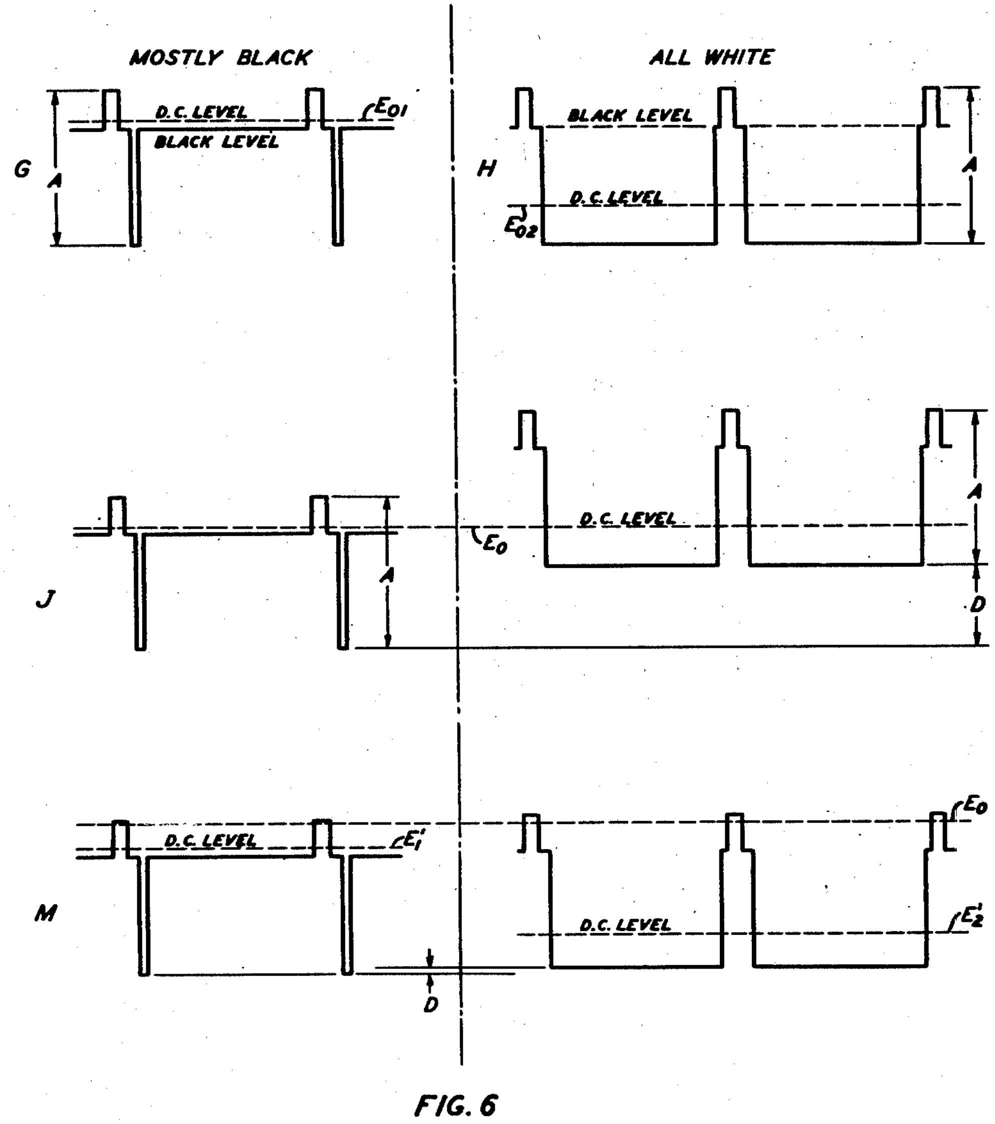
Fig. 6 shows graphs illustrating the operation of the direct current bias restoring circuit.

The function of the direct current restorer will be described with the aid of Fig. 6. Graph G represents a part of a television video signal corresponding to one extreme condition which may occur, i. e., a picture which is all black except for one very narrow vertical white line. Graph H represents part of a video signal when the opposite extreme condition obtains, i. e., for a picture which is all of maximum white. In both cases the pulse shown having a positive sense represents the horizontal synchronizing pulse. Parts of the wave shown below the black level represent the picture signal, the narrow pulse in graph G corresponding to the narrow white line mentioned above. The dotted line marked $E_{01}$ in graph G represents the direct current level of the wave after it has reached a steady state condition. Similarly, the line $E_{02}$ represents the direct current level in graph H. Now the grid of tube 63 is coupled back to the plate of the preceding amplifier through a capacitor with the result that without direct current restoration the direct current level at the grid of tube 63 remains constant at some value $E_0$ regardless of the character of the video signal. Graph J shows the effect at the grid of tube 63 of a change from the first type of video signal to the second type. It is seen that although the peak amplitudes are the same in the two cases the voltage limits are different since the direct current level must remain constant at the $E_0$ value. Obviously a system which is to transmit both types of video signals must be capable of handling not only the peak amplitude A but the level $A+D$ with the required degree of linearity. In any practical system the degree of modulation, either AM or FM, must be reduced in the ratio of $A/A+D$ with a corresponding loss in signal-to-noise ratio for the system if D. C. is not inserted. For television this loss of signal-to-noise ratio amounts to 4 decibels.

With the diode restorer 64 operative, conditions are as shown in graph M. With no signal applied the same voltage will exist at the grid of tube 63, the plate of the diode 64 and the cathode of the diode. This is the grid bias voltage and as before is called $E_0$. Now when a video signal is applied there is a tendency for the direct current level of the applied wave to line up with $E_0$ as shown in graph J. This would cause the positive part of the wave to drive the plate of the diode positive with respect to $E_0$ and hence with respect to its cathode which is kept at the value $E_0$ by a large capacity. This, however, would result in a large flow of current through the diode during the positive parts of the wave due to the fact that it has a very low impedance whenever its plate is more positive than its cathode. If the resistor shunting the diode has a high value the side of the coupling condenser connected to the diode plate will be charged far enough negative that even the most positive parts of the wave at the diode plate exceed the cathode voltage $E_0$ by only a small amount. For the "mostly black" signal this back bias voltage is indicated by $E_1'$ of graph M. For the "all white" signal back bias is indicated by $E_2'$. Since back bias is greater for the "all white" than for the "mostly black" signal the positive portions of the "all white" signal must exceed $E_0$ by an amount greater than that by which the positive portions of the "mostly black" signal exceeds $E_0$. Since the impedance of the diode decreases very rapidly with increase of voltage across its plate-to-cathode circuit, the maximum positive values of signal voltage for the two types of signal will vary but little from each other and from $E_0$. The restorer is seen to set a "barrier" at the voltage $E_0$ and the maximum positive voltage at the diode plate can never be more than slightly greater than $E_0$. The device thus reduces the voltage difference corresponding to D of graph J to a very small value. Note that in the FM oscillator the biasing voltage $E_0$ sets the frequency at one edge of the band rather than setting mid-band frequency which, when the restorer is employed, depends upon the type of signal applied.

The invention is not to be construed as limited to the circuit details or numerical or quantitative values of this disclosure nor to the specific embodiments, since these are all intended as illustrative examples and the scope of the invention is defined in the claims.

What is claimed is:

1. In a frequency modulating system, a grid-controlled space discharge device, a feedback path external to said device from output to input thereof to cause the device to generate sustained oscillations, a current-controlled phase shifter included in said feedback path, a source of modulating current for controlling the phase shift produced in said phase shifter as a function of instantaneous modulating current, and an anti-resonant circuit bridged across said feedback path, said circuit being tuned to a desired normal oscillation frequency and said phase shifter producing a frequency independent phase shift having a normal value in the absence of a modulating current sufficient to cause the system to oscillate at the frequency to which the antiresonant circuit is tuned.

2. The system according to claim 1 including a current-dependent non-linear resistance shunting said antiresonant circuit to reduce amplitude modulation in the system.

3. A frequency modulation system comprising a grid-controlled vacuum tube, a feedback path coupling the input and the output terminals thereof to produce self oscillation, a signal source, electronic phase shifting means included in the feedback path and controlled by the voltage of the signal source to produce incremental variations of the phase shift in the feedback path proportional to the instantaneous signal voltage, a frequency determining circuit comprising an antiresonant circuit tuned to a high frequency bridged across the feedback path and amplitude limiting means comprising a voltage sensitive resistance element responsive to substantially instantaneous voltage variations connected in parallel with said anti-resonant circuit.

4. An oscillation generator comprising two grid-controlled tube stages in tandem in a closed regenerative loop, said two stages each contributing substantially half the total phase shift around the loop when the loop is oscillating at nominal frequency, a modulating input coupled to one of said stages including means for causing that stage to change its contribution of phase shift under control of impressed modulating voltage, and a frequency dependent phase shift network in said loop for compensating the change in phase shift contributed by said one stage, said frequency dependent network comprising an antiresonant circuit tuned to said nominal frequency.

5. A frequency modulating system comprising a grid-controlled broad band amplifier tube, a feedback path from its output to its input for causing said tube to generate oscillations, said feedback path external to said tube including in tandem relation an electronic phase shifter and a frequency determining reactance network, said phase shifter having a phase shift characteristic that is substantially independent of frequency and substantially linear with respect to impressed signal current and said network comprising an antiresonant circuit tuned to a desired oscillation frequency.

6. The system according to claim 5 in which said network includes a damping resistor in parallel with said network comprising a resistor element having a non-linear volt-ampere characteristic.

7. The system according to claim 5 in which said network includes a damping resistor in parallel with said antiresonant circuit comprising a resistor element having a non-linear volt-ampere characteristic and means for applying an adjustable bias voltage to said element.

8. The system according to claim 5 in which said network comprises an anti-resonant circuit bridged across said feedback path tuned to the nominal oscillation frequency of the system, a damping resistor in parallel with said antiresonant circuit having a resistance value dependent on the voltage applied thereto said modulating system including in its output a circuit for deriving a voltage indicative of variations in the high frequency current in said output during a modulation cycle, and a circuit for applying said voltage as a variable bias voltage to said resistor, in such direction as to reduce the magnitude of said variations.

9. The system according to claim 5 in which said electronic phase shifter comprises a pair of grid-controlled vacuum tubes with their space current variations added in quadrature relation to each other and a source of modulating voltage applied to said grids in push-pull.

10. In a frequency modulator, a grid-controlled vacuum tube oscillation generator, an electronic phase shifter in tandem therewith in the feedback loop thereof, said phase shifter comprising a pair of grid-controlled tubes having their high frequency plate currents added to each other in quadrature, a source of signals containing variable direct current bias, a connection from one side of said source to the cathode of one of said pair of tubes and to the grid of the opposite tube, a connection from the other side of said source to the grid of said opposite tube and the cathode of said one tube, and circuit means for maintaining the cathodes of said pair of tubes at the same oscillation frequency potential but at the potential difference of said source at the signal frequency.

11. The modulator claimed in claim 10 in which said source of signals includes a direct current grid-controlled amplifier whose output is connected to the input of said modulator, an alternating current signal input to said amplifier, and a direct current bias restoring circuit comprising a rectifier shunted across the grid circuit of said direct current amplifier with its positive pole connected to the amplifier grid.

OWEN E. DE LANGE.
WILLIAM M. GOODALL.

REFERENCES CITED

The following references are of record in the file of this patent:

UNITED STATES PATENTS

| Number | Name | Date |
|---|---|---|
| 2,316,927 | Winlund | Apr. 20, 1943 |
| 2,361,658 | Sinnett | Oct. 31, 1944 |
| 2,408,684 | Roberts | Oct. 1, 1946 |
| 2,421,725 | Stewart | June 3, 1947 |